H. M. MARTIN.
PROCESS AND APPARATUS FOR TREATING STORAGE BATTERY PLATES.
APPLICATION FILED NOV. 14, 1914.
1,310,871. Patented July 22, 1919.
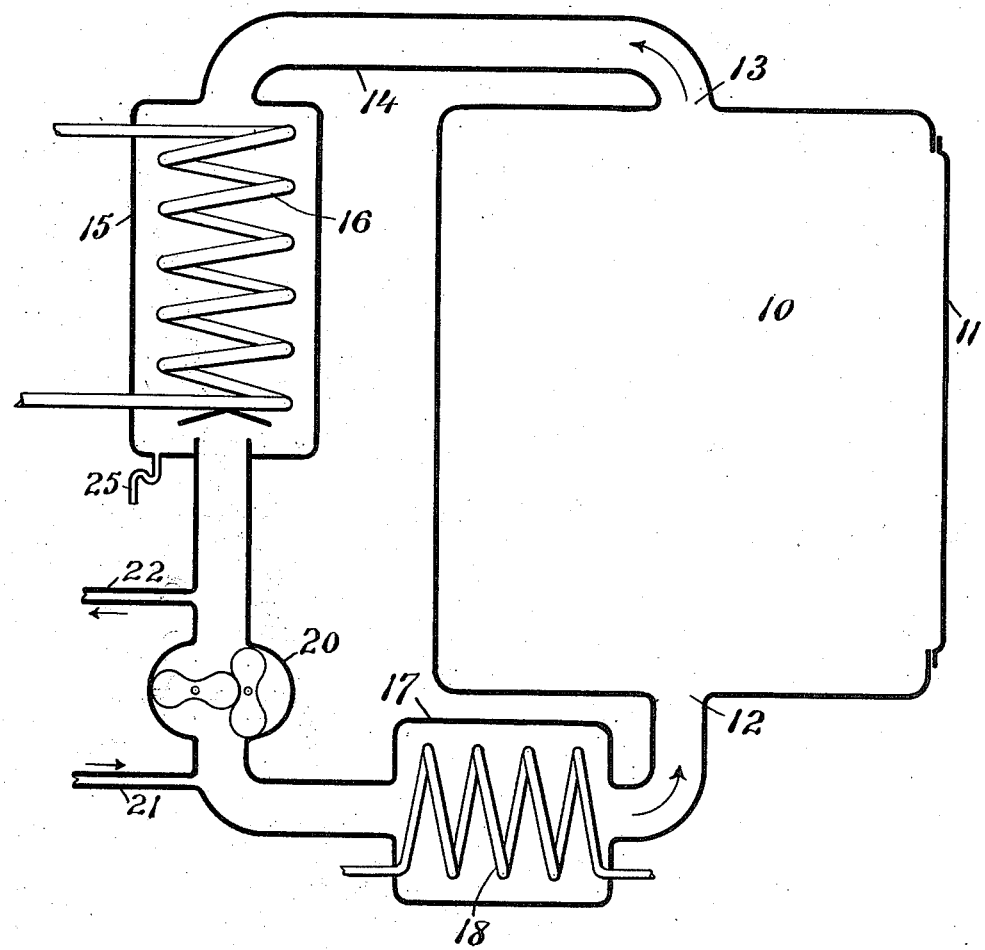
Attest:
Lillian R. Fox.
R. Richardson
Inventor:
Harold M. Martin
by Arthur L. Kent
his Atty

UNITED STATES PATENT OFFICE.

HAROLD M. MARTIN, OF NEW YORK, N. Y., ASSIGNOR TO PHILADELPHIA STORAGE BATTERY COMPANY, OF PHILADELPHIA, PENNSYLVANIA, A CORPORATION.

PROCESS AND APPARATUS FOR TREATING STORAGE-BATTERY PLATES.

1,310,871.        Specification of Letters Patent.        Patented July 22, 1919.

Application filed November 14, 1914. Serial No. 872,092.

*To all whom it may concern:*

Be it known that I, HAROLD M. MARTIN, a citizen of the United States, residing at New York city, in the county of New York and State of New York, have invented certain new and useful Improvements in Processes and Apparatus for Treating Storage-Battery Plates, fully described and represented in the following specification and the accompanying drawings, forming a part of the same.

This invention relates to the manufacture of storage battery plates, and comprises a process of producing potentially active negative plates, wherein the negative plates in charged or active condition, that is, with the active material of the plates in the metallic state, are dried in an atmosphere of a gas which is chemically inert with respect to the active material of the plate in its metallic state. The invention comprises further an apparatus for carrying out or practising the process.

After the active material of a negative plate of a storage battery has been reduced to the metallic state by the initial or any subsequent charging passage of the electric current, withdrawal of the negative plate from the electrolytic solution and exposure to air will result in a substantial oxidizing of the active material so that when subsequently immersed in the electrolyte with suitable positive plates recharging is practically necessary. In order to maintain the plates in condition for efficient discharge, therefore, it is customary and necessary in the absence of special treatment of the negative plates that they shall be kept immersed in the acid or other electrolytic solution. This necessity of keeping the negative plates immersed to prevent access of air thereto has various objections, such as the increased difficulty and cost of transportation, and furthermore, with the usual lead filled plates the battery after charging will gradually lose its charge and the plates will in time become impaired through the formation of sulfate of lead.

The object of the present invention is to avoid the necessity of keeping the negative plates of storage batteries immersed by drying the plates without changing the condition of the active material, thereby putting it in a condition in which it will not readily combine with the oxygen of the air in the absence of moisture and at normal temperatures. Negative plates so dried may be readily transported and kept for long periods of time without change from the condition in which they will provide with suitable positive plates in the proper condition a so-called charged cell for supplying electrical energy. With this object in view, negative storage battery plates with the active material in the charged or metallic state have been dried by heating in a partial vacuum; but this method of drying has the disadvantages that because of the practical impossibility of obtaining an absolute vacuum in operating on a commercial scale the active material of the plates oxidizes to such an appreciable extent during the drying process as to materially reduce its discharging efficiency, and that the supplying of heat to the plates during the drying in partial vacuum is a matter of some difficulty and requires a comparatively expensive and cumbersome apparatus since the application of heat to the plates must be by contact. My invention avoids the disadvantages of the vacuum drying process and makes it possible to dry the plates quickly and with practically no oxidation of the active material and with the use of a comparatively simple and inexpensive apparatus.

In preparing the negative plates in accordance with my process, after being charged, or having their active material reduced to the metallic state, that is, in the case of plates filled originally with a lead oxid paste, after having such active material reduced to the condition of spongy lead, the plates are dried in a gas which will not combine chemically with the active material of the plate in its metallic state whether wet or dry, that is, a gas which is chemically inert with respect to the active material when in either a wet or dry state. With lead filled plates, I have used hydrogen gas, nitrogen has practical advantages for commercial use, and other inert gases such as carbon dioxid would apparently meet the requirements. When the plates have been charged in a liquid containing sulfuric acid or other substance which if left in the plate would hinder or prevent thorough drying, the plates should be thoroughly washed in water before drying. The gas in which the plates are dried should most desirably be caused to move past the plates and should of course be in a suitable dry condition, and to expedite the drying operation the drying gas may be, and most desirably is, heated to a suitable temperature which should of course not be high enough to affect any of the substances comprised in the plate. If a heated gas is employed, the plates should be cooled before being removed from the gas so as to avoid access of air to the plates while hot, thus avoiding oxidation which would result from the action of the oxygen of the air on the hot metallic lead or other active material of the plates.

An apparatus suitable for carrying out the process and embodying the apparatus features of the invention is illustrated diagrammatically in the accompanying drawing. Referring to the drawing, the apparatus shown is intended for drying with a stable gas and comprises an air tight drying chamber 10 provided by a suitable casing having a suitably arranged door 11 through which the plates to be dried may be introduced into and taken from the chamber. The chamber is provided with an inlet 12 for the supply of the inert drying gas, and with an outlet 13 for escape of the displaced air and thereafter of the drying gas so that a movement of the gas through the chamber may be maintained. For economy in the use of the gas, the outlet 13 is connected outside the chamber with the inlet 12 by a circulation pipe 14 so that the gas may be caused to circulate continuously through the chamber and through the pipe 14. Interposed in the pipe 14 is a drier 15 which may be formed as shown by a cooling and condensing chamber provided with a cooling coil 16, and between the cooler and the inlet 12 is connected a heater 17 which may be formed as shown by a chamber containing a steam or other heating coil 18. Circulation may be maintained in any suitable manner but usually it will be most desirable to connect in the pipe 14 a suitable pump 20 as shown. An inlet pipe 21 leads into the pipe 14 on one side of the circulating pump 20 for supplying the inert drying gas to fill the system, and an outlet 22 opens from the pipe 14 at the other side of the pump for allowing the air to escape from the system as the drying gas is forced therein. The inlet 21 and outlet 22 will of course be provided with suitable valves for closing them.

In practising my process with the apparatus shown, the plates to be dried are placed in the chamber 10, being supported therein by suitable boxes and racks or other means whereby the plates are caused to stand separated from each other so as to permit a free circulation of the drying gas past them and in contact with the surface of their active material. The door of the chamber being then closed, the air in the drying chamber and in the other portions of the circulation system is displaced by the drying gas introduced through the inlet 21, the air escaping through the outlet 22. When the air has all been displaced so that the atmosphere within the system consists only of the hydrogen or nitrogen or other stable inert gas used, the inlet 21 and outlet 22 are closed and the circulating pump 20 is put into operation. The gas is heated in passing through the heater 17 before entering the drying chamber 10, and the heated gas passing between the plates in the drying chamber carries away moisture which, as the gas passes through the cooler 15, is condensed and falls to the bottom of the cooler and escape through a trapped drip 25. The cooled and dried gas is then reheated before again entering the drying chamber. When the drying operation is completed, the application of heat to the circulating gas is stopped, as by cutting off the supply of heating fluid to the coil 18, but the circulation of the gas is thereafter continued until the temperature of the plates has been reduced to practically normal atmospheric temperature. The dried plates may be removed from the drying chamber. The cessation of the passage of water from the drip pipe 25 will indicate that the plates are dry.

Batteries made up with negative plates treated or prepared according to my process may be allowed to stand for a long period and be at all times ready for discharge on application of the electrolyte, and the prepared negative plates may equally well, of course, be kept without being made up in batteries, lasting without deterioration. The plates should be kept free from moisture and from access of an unduly damp atmosphere. I believe that the period during which the plates will retain their properties and be ready for use in batteries without recharging is practically unlimited provided they are kept absolutely dry and free from access of any moisture.

It will be understood that the invention considered either as a process or an apparatus invention is not to be limited to, or to the use of, the exact form of apparatus shown.

What is claimed is:

1. The process of preparing potentially active negative storage battery plates which comprises drying the active material of such plates in an atmosphere of a heated gas inert to said material in its metallic state; and cooling the material before exposing the plates to air.

2. The process of drying negative storage battery plates having their active material in the metallic state, which comprises subjecting said plates to the drying action of a moving atmosphere of a gas inert with respect to such active material; repeatedly heating said gas and thereafter subjecting the plates to its action; and finally subjecting the plates to cooled gas before exposing them to the air.

3. The process of drying negative storage battery plates having their active material in the metallic state, which comprises subjecting the plates to the drying action of a gas inert with respect to such active material; cooling the gas to condense the moisture therefrom; heating the gas; causing the hot gas to further act on the plates; and finally subjecting the plates to the action of cooled gas before exposing them to the air.

4. The process of drying negative storage battery plates having their active material in the metallic state, which comprises the circulation over said plates of heated gas inert with respect to such active material until the moisture is substantially removed therefrom; and thereafter circulating cooled inert gas over the plates until their temperature is reduced substantially to atmospheric normal.

5. The process of drying negative storage battery plates having their active material in a metallic state which consists in heating a body of gas inert to the active material of said plates; passing said heated gas over the plates to remove the moisture therefrom; cooling the gas to remove the moisture carried by it; reheating the gas and so on, until the plates are dry.

6. The process of drying negative storage battery plates having their active material in a metallic state which consists in heating a body of gas inert to the active material of said plates; passing said heated gas over the plates to remove the moisture therefrom; cooling the gas to remove the moisture carried by it; reheating the gas and so on until the plates are dry; and thereafter continuing the circulation of the gas over the plates while it is in a relatively cool condition.

In testimony whereof I have hereunto set my hand in the presence of two subscribing witnesses.

HAROLD M. MARTIN.

Witnesses:
A. L. KENT,
PAUL H. FRANKE.